US011245969B2

(12) United States Patent
Schmitz et al.

(10) Patent No.: US 11,245,969 B2
(45) **Date of Patent: *Feb. 8, 2022**

(54) METHOD FOR COLLECTING DATA, SENSOR AND SUPPLY NETWORK

(71) Applicants: DIEHL METERING SYSTEMS GMBH, Nuremberg (DE); DIEHL METERING S.A.S, Saint Louis (FR)

(72) Inventors: Stefan Schmitz, Nuremberg (DE); Thomas Kauppert, Nuremberg (DE); Petra Joppich-Dohlus, Rathsberg (DE); Achim Schmidt, Weissenohe (DE); Christoph Sosna, Nuremberg (DE); Klaus Gottschalk, Winkelhaid (DE); Guy Bach, Waldighoffen (FR); Aster Breton, Mullhouse (FR)

(73) Assignees: Diehl Metering Systems GmbH, Nuremberg (DE); Diehl Metering S.A.S., Saint Louis (FR)

( * ) Notice: Subject to any disclaimer, the term of this patent is extended or adjusted under 35 U.S.C. 154(b) by 129 days.

This patent is subject to a terminal disclaimer.

(21) Appl. No.: 16/715,063

(22) Filed: Dec. 16, 2019

(65) Prior Publication Data

US 2020/0196032 A1 Jun. 18, 2020

(30) Foreign Application Priority Data

Dec. 14, 2018 (DE) ............................ 102018009825

(51) Int. Cl.

*G01D 4/00* (2006.01)
*G06Q 50/06* (2012.01)

(Continued)

(52) U.S. Cl.

CPC ................ *H04Q 9/02* (2013.01); *H04W 4/38* (2018.02); *H04Q 2209/60* (2013.01); *H04Q 2213/1313* (2013.01)

(58) Field of Classification Search

None

See application file for complete search history.

(56) References Cited

U.S. PATENT DOCUMENTS 8,949,055 B2 2/2015 Hampel et al.
2004/0113812 A1* 6/2004 Bianchi .................... H04Q 9/00 340/870.02

(Continued)

FOREIGN PATENT DOCUMENTS

| | | | |
|---|---|---|---|
| DE | 102011078824 | A1 | 1/2013 |
| DE | 102016007287 | A1 | 12/2017 |
| EP | 2449705 | B1 | 4/2013 |

*Primary Examiner* — Srilakshmi K Kumar
*Assistant Examiner* — Jerold B Murphy
(74) *Attorney, Agent, or Firm* — Laurence A. Greenberg; Werner H. Stemer; Ralph E. Locher

(57) ABSTRACT

A method for collecting data of a consumption, a physical or physico-chemical parameter and/or an operating state in a supply network for consumables. A measuring element of a local sensor provides elementary measuring units, which correspond to at least one physical or physico-chemical variable or at least one physical or physico-chemical parameter, as raw measurement data. In order to determine the measurement resolution of the sensor, the conditions for generating time stamps are determined in advance using a correlation model, time stamps of successive raw measurement data are generated in the sensor on the basis of the correlation model, and the time stamps are transmitted via a wired connection and/or via a radio path. The raw measurement data are reconstructed and evaluated based on the time stamps with the correlation model. The conditions for gen- (Continued)

erating time stamps can be changed dynamically within the framework of the correlation model.

30 Claims, 12 Drawing Sheets

(51) Int. Cl.
*H04Q 9/02* (2006.01)
*H04W 4/38* (2018.01)

(56) References Cited

U.S. PATENT DOCUMENTS

| | | | | |
|---|---|---|---|---|
| 2009/0135836 | A1* | 5/2009 | Veillette | G01D 4/004 370/400 |
| 2012/0280832 | A1* | 11/2012 | Jonsson | G01D 4/00 340/870.02 |
| 2015/0077266 | A1* | 3/2015 | Hammill | G01D 4/004 340/870.02 |
| 2016/0329928 | A1* | 11/2016 | Beroset | H04L 69/04 |
| 2018/0284735 | A1* | 10/2018 | Celia | G05B 19/4185 |
| 2020/0191609 | A1* | 6/2020 | Schmidt | G01F 9/001 |
| 2020/0196031 | A1* | 6/2020 | Joppich-Dohlus | G01D 9/005 |
| 2020/0196032 | A1* | 6/2020 | Schmitz | H04Q 9/00 |
| 2020/0196033 | A1* | 6/2020 | Schmitz | G01D 4/002 |

* cited by examiner

METHOD FOR COLLECTING DATA, SENSOR AND SUPPLY NETWORK

CROSS-REFERENCE TO RELATED APPLICATION

This application claims the priority, under 35 U.S.C. § 119, of German patent application DE 10 2018 009 825, filed Dec. 14, 2018; the prior application is herewith incorporated by reference in its entirety.

BACKGROUND OF THE INVENTION

Field of the Invention

The present invention pertains to a method for collecting data, preferably data in connection with a consumption, a physical or physico-chemical parameter and/or an operating state, during the operation of a local sensor, preferably a sensor for a consumption meter, as part of a supply network which comprises at least one local sensor, preferably a plurality of local sensors, and is intended to distribute a consumable. The sensor contains a measuring element, which provides elementary measuring units that correspond to at least one physical or physico-chemical variable or at least one physical or physico-chemical parameter, as raw measurement data. The sensor is set up for radio communication and includes a memory.

The invention also pertains to a corresponding sensor.

Finally, the invention pertains to a supply network for distributing a consumption medium, having one or more local sensors for generating and/or forwarding time stamps of raw measurement data on the basis of the correlation model, preferably raw measurement data in connection with a consumption of consumption medium, a physical or physico-chemical parameter and/or an operating state of a consumption meter. The supply network further has a data collector, a primary communication path between the respective sensor and the data collector, a head end for evaluating the data, and a tertiary communication path between the data collector and the head end.

Consumption meters are part of supply networks for distributing consumables, for example gas, water, heat or electricity, and are used to generate consumption data. Consumption data are calculated by a microprocessor in the meter on the basis of raw measurement data provided by a measuring element of a sensor and are forwarded to a central data management means (head-end system) via a communication system in the form of a bus system, in particular a so-called M-bus system. The data are, in particular, the current consumption, that is to say the meter reading.

In this case, raw measurement data are generated by the measuring element of a sensor in the consumption meter at predetermined predefined times, are evaluated by a microprocessor in the consumption meter, that is to say are converted into consumption data, and the resulting consumption data are then retrieved from the individual locally arranged consumption meters by a reading or receiving device (M-bus master or concentrator or data collector) via a primary communication path at defined times. The consumption data are then transmitted on to a head-end system by the reading or receiving device via a tertiary communication path, for example based on LAN, GPRS, 3G, LTE. The consumption data can then be displayed in the head end or used for invoicing. The previous concept of consumption data acquisition is limited in terms of both its depth of information and its amount of information.

SUMMARY OF THE INVENTION

It is accordingly an object of the invention to provide a data collection method, a sensor, and a supply network which overcome the above-mentioned and other disadvantages of the heretofore-known devices and methods of this general type and which provides for a method for collecting and/or forwarding data and a sensor to be used for this purpose, each with an increased information content.

With the foregoing and other objects in view there is provided, in accordance with the invention, a method for collecting data during operation of a local sensor in a supply network for distributing a consumable, the method comprising:

providing the sensor with a measuring element, with radio communication capability and a memory;

providing elementary measuring units with the measuring element of the sensor, the elementary measuring units corresponding to at least one physical or physico-chemical variable or at least one physical or physico-chemical parameter, and forming raw measurement data;

in order to determine a measurement resolution of the sensor, determining conditions for generating time stamps in advance using a correlation model;

generating time stamps of successive raw measurement data in the sensor based on the correlation model;

transmitting the time stamps via a wired connection and/or a radio connection, whereupon the raw measurement data acquired by the measuring element are reconstructed and evaluated based on the time stamps using the correlation model; and dynamically changing conditions for generating time stamps within a framework of the correlation model.

In other words, the invention provides a method for collecting data, wherein the data are preferably data in connection with a consumption, a physical or physico-chemical parameter and/or an operating state, during operation of a local sensor, preferably a sensor for a consumption meter, as part of a supply network which comprises at least one local sensor, preferably a plurality of local sensors, and is intended to distribute a consumable, wherein the sensor contains a measuring element, the measuring element of the respective sensor provides elementary measuring units, which correspond to at least one physical or physico-chemical variable or at least one physical or physico-chemical parameter, as raw measurement data, and the sensor comprises radio communication means and memory, characterized in that, in order to determine the measurement resolution of the sensor, the conditions for generating time stamps are determined in advance using a correlation model, time stamps of successive raw measurement data are generated in the sensor on the basis of the correlation model, the time stamps are transmitted via a wired connection and/or via a radio path, with the result that the raw measurement data acquired by the measuring element are reconstructed and evaluated on the basis of the time stamps using the correlation model, wherein the conditions for generating time stamps and/or a corresponding change rate can be changed dynamically within the framework of the correlation model.

According to the invention, in order to determine the measurement resolution of the sensor, the conditions for generating time stamps are determined in advance using a correlation model. Time stamps of successive raw measurement data are generated in the sensor on the basis of the correlation model and are stored in the memory. Only the time stamps assigned to the acquired raw measurement data are then transmitted via the primary communication path, with the result that the raw measurement data acquired by the measuring element can be reconstructed again after transmission and can be evaluated on the basis of the time stamps arriving at the master using the correlation model. This dispenses with computationally complex and therefore energy-intensive computing operations in the region of the local sensor. Computationally complex and energy-intensive computing operations can therefore be moved to the region of the master or a head end. The method according to the invention makes it possible to provide time stamps of raw measurement data in a continuous, complete and consistent temporal relationship, that is to say without a gap, in particular in the region of a remote central processing system or a head-end system. The raw measurement data reconstructed from the time stamps can be continuously assigned to the temporal profile, that is to say represent a real-time profile which excludes discontinuous gaps or times in which data are missing. The continuous raw measurement data stream generated in the head end in accordance with the method according to the invention has a much higher resolution over the continuous time axis than previous solutions. In addition to a consumption calculation, for example, the invention makes it possible to carry out a much greater number of calculations and/or determinations and/or functions, including "business" functions, for example in the head-end system, than was previously possible. On account of the method according to the invention, the structure of the sensor can also be considerably simpler and more cost-effective since complex microprocessors for calculations, for example for calculating the flow rate, are dispensed with. On account of the captured temporal relationship of the raw measurement data, manipulations can be avoided since the measurement results can be compared, over their entire temporal profile, with empirical values over the entire time axis. Furthermore, the energy consumption of the subassembly comprising the sensor and the time stamp preparation means and/or the communication means is considerably lower than in previous embodiments which locally evaluate the data owing to the fact that energy-intensive computing power is dispensed with. The time stamps may be times or time differences. The times or time differences may be actual time data or real-time data or may be at least oriented thereto. The time differences may be formed from time stamp to time stamp and/or from a permanently predefined time.

According to the invention, the conditions for generating time stamps can be changed dynamically within the framework of the correlation model. The dynamic change of the conditions for generating time stamps can advantageously have a direct influence on the volume of data transmitted via the radio connection. It is therefore possible to easily react to changes in the radio connection without resulting in tearing of the data stream or of the reconstructed raw measurement data stream.

The local sensor(s) can be expediently connected to a data collector via a primary communication path, a tertiary communication path can be provided between the data collector and a head end, and the time stamps transmitted by sensors can be collected, stored and/or evaluated in the data collector and/or in the head end. Transmitting the time stamps via the primary and tertiary communication paths makes it possible to carry out a considerably greater number of calculations and/or determinations and/or functions, including "business" functions, than before in the head end, where sufficient computing power is available.

A particular value or a particular value change or a particular value difference of the at least one physical or physico-chemical variable or the at least one physical or physico-chemical parameter can be determined in the correlation model for the assignment of a time stamp, wherein, if the particular value or the particular value difference or the particular value change is captured by the measuring element, the time stamp is triggered, is stored as such in the memory of the sensor and is provided for transmission. If the value captured by the sensor does not change, but time stamp is not generated. It is therefore typical of the method according to the invention that relatively long periods can elapse without a time stamp. Therefore, data need not be continuously transmitted. Nevertheless, the method has a very high resolution.

In particular, a gradually or incrementally increasing meter reading and/or a value table can be represented by means of time stamps within the scope of the correlation model.

The time stamps are preferably provided with a sign, for example a positive or negative sign. This is advantageous, in particular, when representing a value table since it is thereby stipulated whether the specific time stamp relates to a rising or falling value in the value table.

According to the invention, a plurality of time stamps can each be transmitted as a data packet along the primary communication path.

A raw measurement data stream can be advantageously generated on the basis of the time stamps arriving at the data collector and/or at the head end using the correlation model. The relevant successive time stamps are not, in particular, calculations and/or evaluations.

It is particularly advantageous that the conditions for generating time stamps can be stipulated by the data collector and/or by the head-end system. The data collector and/or the head-end system can therefore easily stipulate or dynamically change the conditions for generating time stamps and can transmit them to the sensor or the consumption meter.

It is particularly advantageous that a scaling factor can be provided for the purpose of stipulating the conditions for generating time stamps. The scaling factor changes the conditions for generating time stamps on the basis of the raw measurement data.

The scaling factor can be advantageously transmitted from the data collector and/or from the head-end system to the sensor or the consumption meter. The data collector and/or the head-end system can stipulate the scaling factor for an individual sensor or consumption meter and can transmit it to the latter.

It is particularly advantageous that the conditions for generating time stamps are stipulated on the basis of a power analysis of the radio connection. As a result of dynamically stipulated conditions for generating time stamps, a power change in the radio connection can be taken into account. If the throughput or the transmission bandwidth of the radio connection decreases, the situation may occur in which the radio connection is no longer able to transmit the current volume of data, in particular in the form of time stamps. The volume of data to be transmitted can therefore be adapted and possibly reduced by adapting the conditions for generating time stamps.

The conditions for generating time stamps can be advantageously stipulated on the basis of the requirements of an application, in particular an application which uses the reconstructed raw measurement data. Different applications require different resolutions of the reconstructed raw measurement data, for example. The volume of data to be transmitted can therefore be influenced, for example, by adapting the conditions for generating time stamps, with the result that the utilization of the radio connection is adapted to the requirements of the application. For example, an application may require a higher accuracy or granularity of the reconstructed raw measurement data, which results in more frequent time stamps, for example. The conditions for generating time stamps and therefore the raw measurement data stream can be adapted by means of the scaling factor, for example.

The requirements of the application may be expediently temporally variable. The applications which access the reconstructed raw measurement data can therefore change or be replaced over time, with the result that the requirements imposed on the resolution or the granularity of the reconstructed raw measurement data by an application change over time. The bandwidth requirement of the radio connection or of the radio network overall can be reduced by adapting the conditions for generating time stamps to the requirements of the application. For example, a reduction in the volume of data to be transmitted can reduce the utilization of the radio channel, with the result that these capacities which have become free can be used by other applications or other sensors or consumption meters. The efficiency of the entire network can therefore be increased. On the other hand, it is also possible to react to the requirement of an application which requires a higher resolution or granularity of the reconstructed raw measurement data. The sensor and/or the consumption meter or the entire network therefore advantageously provide(s) increased flexibility and adaptability to future requirements.

The conditions for generating time stamps can be expediently dynamically stipulated individually for the individual sensor and/or consumption meter, in particular in the case of a plurality of sensors or consumption meters. The conditions for generating time stamps can be stipulated individually for each consumption meter. An individual value can therefore be transmitted to each sensor and/or consumption meter from the data collector and/or the head-end system.

The reconstructed raw measurement data stream can preferably be evaluated, in the further course of the data processing, at any time on a time-historical basis without a time gap irrespective of its temporal resolution (sampling rate or multiple of the sampling rate). This results in the advantage that, for example, even event-related state changes in the supply network in the past (for example overflow, underflow, leakages, manipulation attempts etc.) can be determined and documented with a precise time allocation and without gaps. There is a high degree of accuracy in the temporal resolution as a result of highly granular time-discrete sampling. It is also possible to display past consumption data to the consumer in a considerably more accurate manner and/or to better incorporate them in evaluations with respect to the consumption behaviour or changes in the latter. This in turn has the effect of optimizing consumption and is a particularly important item of information from the network supplier for the consumer.

The relevant successive raw measurement data are not, in particular, calculations and/or evaluations, but rather elementary measuring units.

For example, the elementary measuring units may be the electrical voltage or the current intensity which is measured. For example, the output voltage of a Hall sensor in the event of its excitation or the voltage of a temperature sensor can be captured. The measured physical variable can expediently relate to a supply medium, preferably water, electricity, fuel or gas, of a supply network.

It is possible for the or one of the measured physical or chemico-physical parameters to be characteristic of the quantity, quality and/or composition of a fluid which flows through the relevant sensor or with which contact is made by the latter.

The elementary measuring unit can expediently generate a time stamp as soon as the elementary measuring unit receives a pulse.

It is possible for the raw measurement data stream to have a temporal resolution which is determined or conditioned by the sensor sampling rate or measuring element sampling rate or a multiple thereof. The raw measurement data stream expediently has a temporal resolution which is determined or at least conditioned only by the sensor sampling rate or measuring element sampling rate or a multiple thereof. The temporal resolution of the raw measurement data stream is preferably in the seconds range, the tenths of a second range, the hundredths of a second range or the thousandths of a second range.

The raw measurement data stream is advantageously continuous and/or complete taking the determined resolution as a basis. This results in a very particularly high measured value resolution along the continuous temporal profile and in turn a particular depth of information as a basis for evaluations or calculations based thereon.

In order to generate the continuous raw measurement data stream, the data packets are expediently combined in a corresponding time sequence reference or are at least related to one another, with the result that the time stamps contained in the packets are subsequently combined again along the real-time axis in accordance with their sampling and prior division into packets, or are at least temporally related to one another in a continuous manner.

Settling the question of when a new data transmission should be carried out in the form of a message or a telegram (of one or more data packets) preferably depends on whether at least one of the two conditions, namely, (a) expiry of a predefined interval of time and (b) reaching a predefined quantity of time stamps since the previous transmission has been satisfied. A time sequence reference of the data packets to be transmitted can be easily implemented on the basis of this.

It is particularly expedient that the method comprises packaging the time stamps by formatting them in data packets of a predetermined fixed size, wherein, each time the accumulated data reach the size of a data packet or the predefined interval of time has expired, a new transmission is initiated.

It is possible to carry out the data transmission with redundancy. The redundancy in the transmission can be expediently achieved by repeatedly transmitting the same data packet in a plurality of successive transmission operations or on different communication paths or radio channels. It is also possible for the redundancy in the transmission to be achieved by repeatedly transmitting the same time stamps. For example, the transmission of a data packet or a time stamp can be repeated five times.

The time stamps can be advantageously compressed and the compression of the time stamps can be carried out in a loss-free manner. The compression of the time stamps can be carried out in a loss-free manner in the region of the sensor or the consumption meter. The time stamps can be expediently transmitted in compressed form and/or via a radio path. The transmission can be carried out repeatedly and in a conditional manner in each case after expiry of a predefined interval of time and/or after reaching a predefined quantity of time stamps which have been collected since a previous transmission.

Alternatively, however, the compression of the time stamps can also be carried out with a predefined permissible loss level. If the data compression is carried out with a predefined permissible loss level, the compression ratio can then be increased to the detriment of lower accuracy in the reproduction at the receiver end if the user or operator prefers an energy saving and accepts a certain inaccuracy in the recovery and reproduction of the original measurement data (that is to say accepts a certain loss). The loss ratio or the compression ratio can be provided as a programmable or adjustable parameter which determines or sets the compression mode.

As clear and non-restrictive examples of data compression algorithms, the following can be taken into account within the scope of the method according to the invention: differential compression (delta encoding) in conjunction with Huffman coding, runlength encoding (RLE) or preferably adaptive binary arithmetic coding (CABAC).

The present invention also claims, in a coordinate claim, a sensor which is set up for local use in a supply network which comprises a plurality of local sensors and is intended to distribute a consumption medium, for example water, gas, electricity, fuel or heat. The sensor can be advantageously operated in accordance with the method as outlined. Such a sensor may be part of a consumption meter. During operation of a supply network, said sensor makes it possible to ensure the consumption and further state properties in a very high resolution along the temporal profile in a gapless and continuous manner.

With the above and other objects in view there also is provided, in accordance with the invention, a supply network for distributing a consumption medium, the supply network comprising:

one or more local sensors for generating and/or forwarding time stamps of raw measurement data on a basis of a correlation model, said local sensors being configured for operation within the method as described herein;

a data collector;

a primary communication path between said sensor and said data collector;

a head end for evaluating the measurement data; and a tertiary communication path between said data collector and said head end.

In other words, the present invention also relates to a supply network for distributing a consumption medium, for example gas, water, electricity, fuel or heat, having at least one local sensor, preferably a plurality of local sensors, for generating and/or forwarding time stamps on the basis of raw measurement data on the basis of the correlation model, preferably raw measurement data in connection with a consumption of consumption medium and/or an operating state of a consumption meter, having a data collector, a primary communication path between the respective sensor and the data collector, a head end for evaluating the data and a tertiary communication path between the data collector and the head end. According to the present invention, the supply network is characterized in that the sensor(s) in the network is/are operated in accordance with the method as outlined.

Other features which are considered as characteristic for the invention are set forth in the appended claims.

Although the invention is illustrated and described herein as embodied in a method for collecting data, a sensor, and a supply network, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
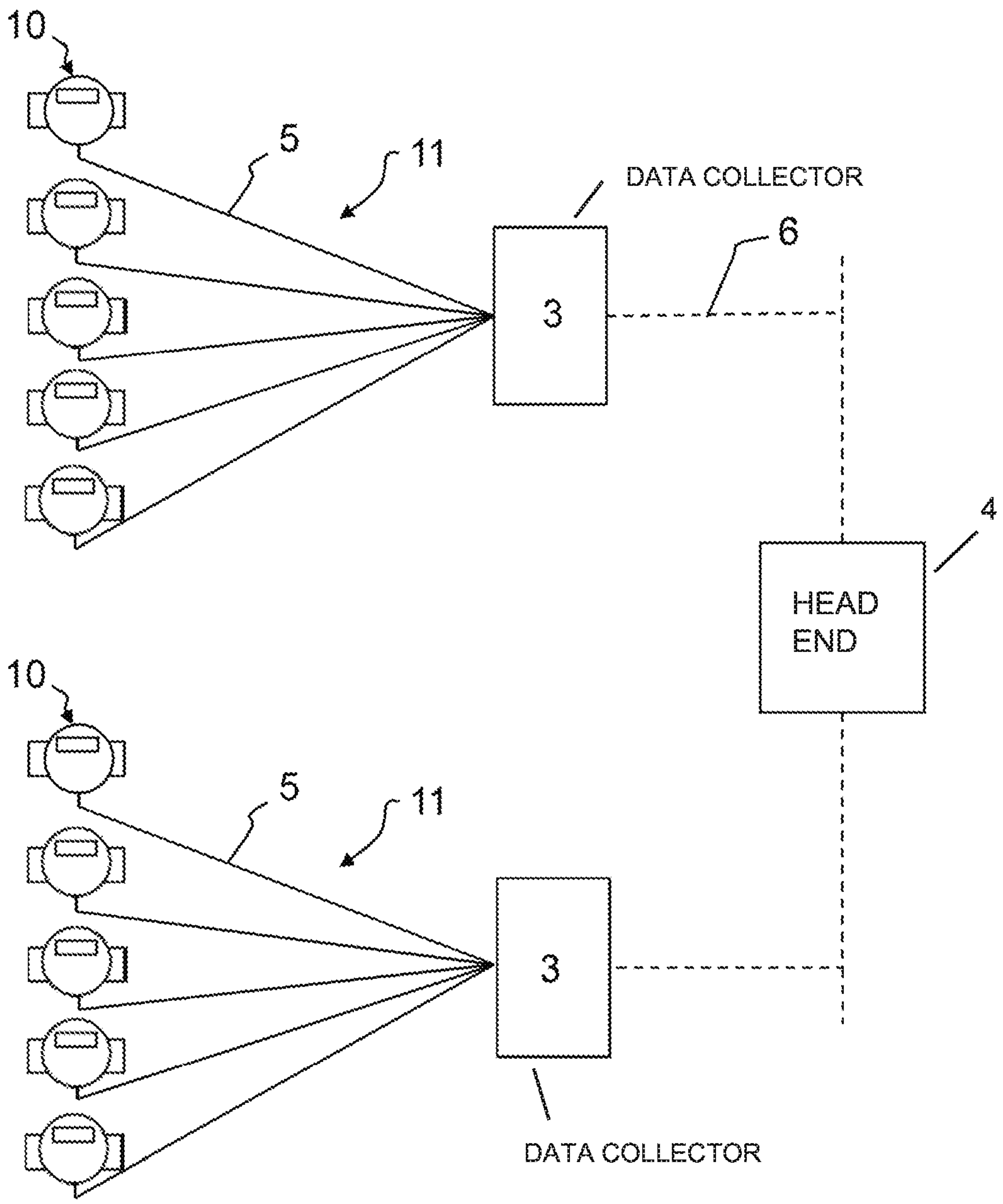
FIG. 1 is a highly simplified schematic illustration of an example of communication paths of a supply network for collecting and/or forwarding data, which have been recorded by a multiplicity of consumption meters, to a data collector and a head end.

Referring now to the figures of the drawing in detail and first, particularly, to FIG. 1 thereof, there is shown a supply network for distributing consumption media, for example gas, water, electricity, fuel or heat. The supply network comprises a multiplicity of individual local consumption meters 10 which may be assigned to different residential units of an apartment building, for example. The individual consumption meters 10, for example water meters, heat meters, electricity meters or gas meters, are connected to a data collector 3, which can act as the master or concentrator, via a wireless communication path.

Each individual consumption meter 10 may be expediently provided with an associated ID (address), with the result that each individual consumption meter 10 can be directly addressed by the data collector 3 and the data present in the respective consumption meter 10 can be retrieved.

The transmission via the primary communication path 5 is predefined by a bus transmission protocol, for example by the wireless M-bus transmission protocol.

The respective data collector 3 is connected to a so-called head end 4 via a tertiary communication path 6. The data from the entire supply network converge in the head end 4. The tertiary communication path 6 may be a wired communication path or a communication path based on radio technology (for example a mobile radio communication path). Alternatively, the data from the respective data collector 3 can also be read by a portable reading device if necessary and can be read in again at the head end 4. The data can be transmitted in different ways along the tertiary communication path 6, for example via LAN, GPRS, LTE, 3G etc.

The individual consumption meters 10 can be operated using an independent energy supply (e.g., rechargeable battery).

As schematically illustrated in FIG. 1, the preferably compressed and formatted time stamps TS of each relevant sensor 1 or consumption meter 10 are transmitted to the data collector 3 which manages a local network of a multiplicity of consumption meters 10 or sensors 1 assigned to it. The preferably compressed and formatted time stamps TS of each of the sensors 1, which are part of the supply network, are transmitted from the data collector 3 to the head end 4.

The data collector 3 can store the time stamps TS retrieved from the respective sensors 1 or consumption meters 10 either over an interval of time (for example one day) and can then forward them to a processing location or to the head end 4. Alternatively, the data can also be immediately forwarded to the head end 4 from the data collector 3.

Figure 2:
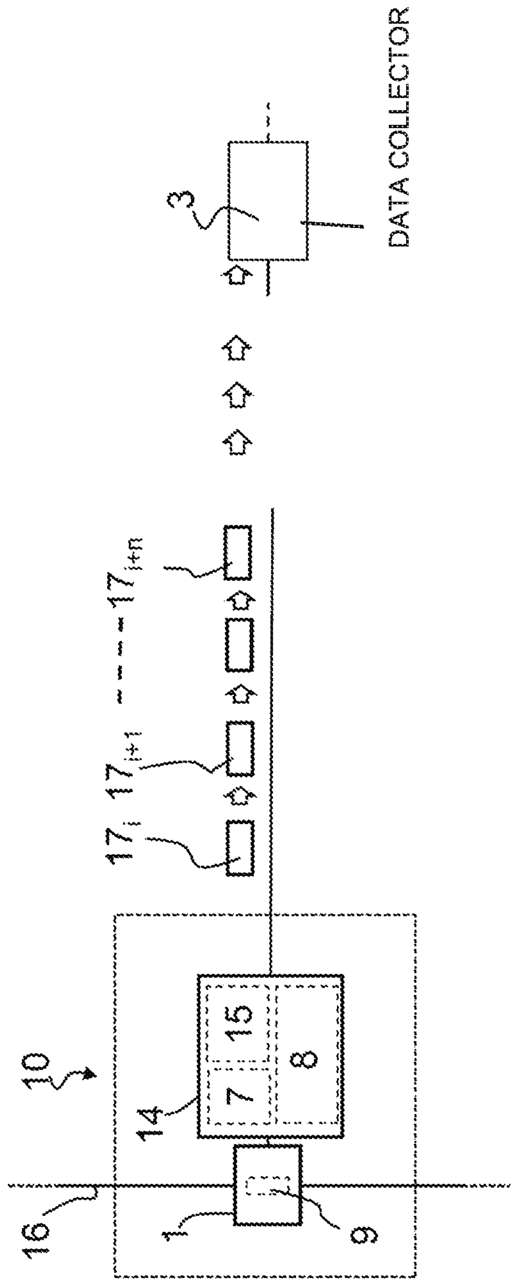
FIG. 2 shows a highly simplified schematic way of illustrating an example of the transmission of time stamps of characteristic raw measurement data to the data collector via the primary communication path from FIG. 1.

According to FIG. 2, the respective consumption meter 10 comprises a sensor 1 equipped with at least one measuring element 9. The sensor 1 is provided for the purpose of generating, via the measuring element 9, raw measurement data which are supplied to a measurement data preparation means 14. The raw measurement data correspond to elementary measuring units of the at least one physical or physico-chemical variable or of the at least one physical or physico-chemical parameter which are provided by the measuring element 9. The raw measurement data may be, for example, raw data in connection with the flow of a medium through a supply line 16, for example a water pipe, in particular the flow rate, the turbidity, the presence of pollutants or the presence of a solid and/or gaseous component or solid and/or gaseous components.

The measured value preparation means 14 of the consumption meter 10 comprises memory 7, a time reference device 15 (crystal) and a microprocessor 8. The above-mentioned components may be provided separately or as an integrated complete component. The consumption meter 10 may comprise its own power supply (not illustrated) in the form of a battery or the like if necessary. The consumption meter 10 can therefore be operated in an autonomous manner in terms of energy.

Prior to the steps illustrated in FIG. 2, a particular value, a particular value change or a particular value difference of the at least one physical or physico-chemical variable or of the at least one physical or physico-chemical parameter is determined within the scope of the correlation model for the assignment of a time stamp TS.

According to the invention, the following steps are carried out in the region of the respective consumption meter 10:

Triggering a time stamp TS if the particular value, the particular value change or the particular value difference is captured by the measuring element 9.

Storing the time stamps TS in the memory 7 of the sensor 1 or of the consumption meter 10.

Transmitting the time stamps TS, preferably in compressed form, via a radio path 11 by preparing time stamp telegrams $\mathbf{17}_i$, $\mathbf{17}_{i+1}$, $\mathbf{17}_{i+n}$ in the measurement data preparation means 14, which telegrams are gradually transmitted to a central processing system, for example a head end 4.

Accordingly, data telegrams $\mathbf{17}_i$, $\mathbf{17}_{i+1}$, . . . , $\mathbf{17}_{i+n}$ containing continuous time stamps TS are transmitted in temporal succession. At the receiver end, a continuous gapless raw measurement data stream of very high resolution can be reconstructed from these time stamps TS using the correlation model.

Figure 3:
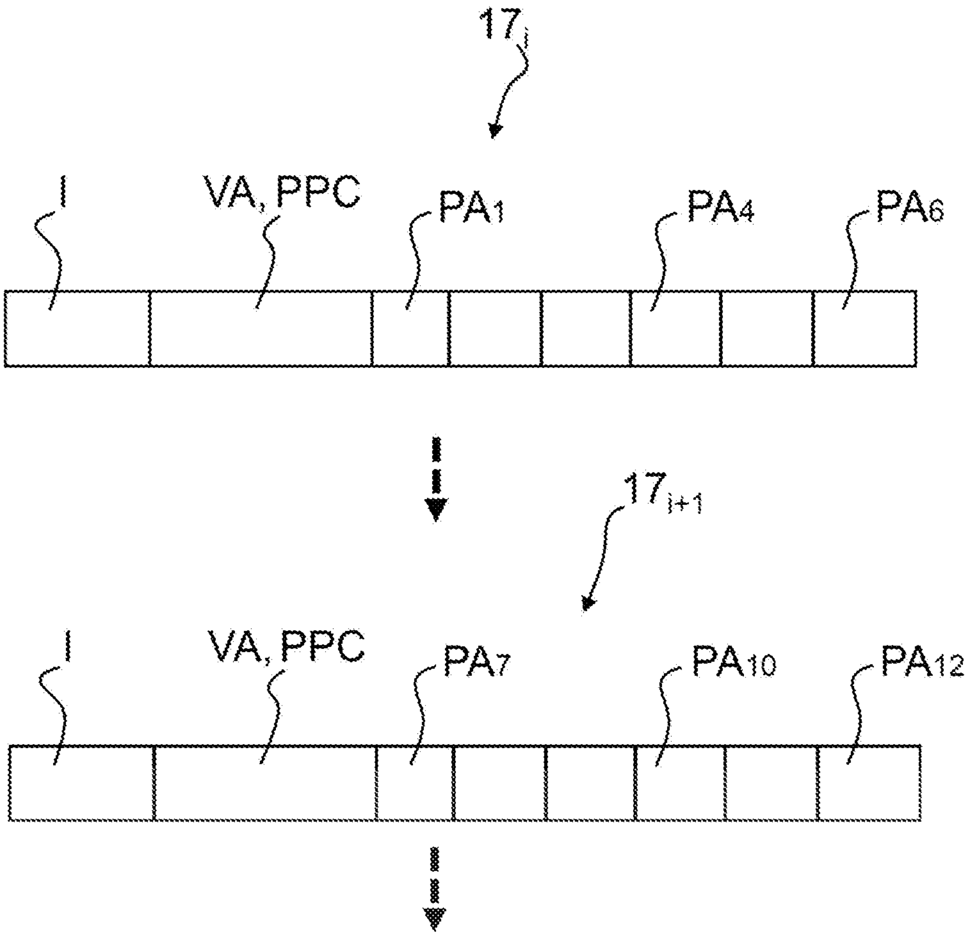
FIG. 3 shows an example of a message structure which is emitted by or retrieved from the measurement data preparation means of the consumption meter according to FIG. 2 via the primary communication path.

As illustrated by way of example in FIG. 3, provision may also be made for the identity (address) I of the relevant sensor 1 and/or the absolute or cumulative value VA of the physical or physico-chemical variable or parameter measured by the relevant sensor 1 to also be transmitted, together with the $PA_j$ packets of the time stamps TS, in the respective data telegram $\mathbf{17}_i$, $\mathbf{17}_{i+1}$, . . . , $\mathbf{17}_{i+n}$, wherein the value VA can be provided with a time stamp or can be assigned to one of the elementary time-stamped items of measurement data, for example an index value of a fluid meter. According to one exemplary embodiment, the value VA may be, for example, the meter reading of a water meter at a particular time or the flow rate through the water meter since a previous data transmission (for example the sum Σ of the time stamps $TS_i$ corresponds to the sum Σ of the flow rate; see FIG. 4).

The method may also involve reading and transmitting the value of at least one other physical or physico-chemical parameter PPC of the environment of the relevant sensor 14 of the fluid measured by the latter at a particular time with the $PA_j$ packets of time stamps TS, for example the conductivity of the fluid, the temperature of the fluid, the pH value of the fluid, the pressure of the fluid, and/or a parameter which is characteristic of the quality and/or the composition of the fluid and/or the temperature of the installation environment of the sensor 1.

FIG. 3 shows, by way of example, the individual data telegrams $\mathbf{17}_i$, $\mathbf{17}_{i+1}$, . . . , $\mathbf{17}_{i+n}$, according to FIG. 2 in somewhat more detail. The data telegrams $\mathbf{17}_i$, $\mathbf{17}_{i+1}$, . . . , $\mathbf{17}_{i+n}$ each comprise, on the one hand, a plurality of data packets $PA_1$-$PA_6$ and $PA_7$-$PA_{12}$, the absolute or cumulative value VA, the identity (address) I of the relevant sensor 1 and the value of at least one other physical or physico-chemical parameter PPC of the environment of the relevant sensor 1 or of the fluid measured by the latter at a particular time, for example the conductivity of the fluid, the temperature of the fluid, the pH value of the fluid, the pressure of the fluid, a parameter which is characteristic of the quality and/or the composition of the fluid and/or the temperature of the installation environment of the sensor 1.

As is also illustrated in FIG. 3 as an example, provision may be made for the compressed time stamps TS to be packaged by formatting the $PA_j$ packets, the size of which must not exceed a predefined maximum value, wherein, each time the accumulated data reach the size of a packet $PA_j$, a new packet or telegram is formed or a new transmission is initiated provided that the predefined interval of time has not previously expired.

According to one preferred variant of the invention, the time stamps TS are compressed before their transmission. The compression of the time stamps TS can be carried out in a loss-free manner.

Alternatively, the compression of the time stamps TS can also be carried out with a predefined permissible loss level. In fact, the compression ratio can then be increased to the detriment of lower accuracy in the reproduction at the receiving end if the user or operator prefers an energy saving and accepts a certain inaccuracy in the recovery and reproduction of the original raw measurement data (that is to say accepts a certain loss). This loss ratio or the compression ratio can be provided as a programmable or adjustable parameter which determines or sets the compression mode.

As clear and non-restrictive examples of data compression algorithms, the following can be taken into account within the scope of the method according to the invention: differential encoding (delta encoding) in conjunction with Huffman coding, runlength encoding (RLE) or preferably adaptive binary arithmetic coding (CABAC).

It is possible for the time stamps TS in the memory 7 of the consumption meter 10 to be deleted only when the transmission of the time stamps TS has been confirmed by the receiver or data collector 3.

Thanks to the invention, it is possible to have, at the data collector 3 or receiving location (for example head end 4), information which makes it possible to authentically and completely reconstruct all time stamps TS provided by the various sensors 1 in a very high temporal resolution and permits unlimited flexibility in the evaluation of said data. The expansion capability of "business" functions can be easily and centrally taken into account without influencing the method of operation or even the structure of subassemblies (sensors, communication means and the like).

The structure of the sensor 1 can be simpler and its operation can be more reliable in comparison with previously known solutions. Furthermore, the energy consumption of the subassembly comprising the sensor 1 and the communication means 2 is lower than in the current embodiments which locally evaluate the data.

The invention can be applied to the measurement and remote reading of a wide variety of parameters and variables. It suffices to be able to accurately date an elementary change (which can be measured by the sensor 1) in a parameter or a variable in accordance with the resolution of the sensor 1 in question (the time stamp TS can correspond to the resolution of the sensor 1 or possibly to a multiple of this resolution).

If the measured variable or the measured parameter can also change decrementally, the time stamps TS are elementary measuring units provided with signs (positive or negative units).

In connection with an advantageous use of the invention, in connection with the term of consumption, provision may be made for the or one of the measured physical variables to relate to a flow medium, wherein each time stamp TS corresponds to an elementary quantity of fluid which is measured by the sensor 1 depending on its measurement accuracy. The measured fluid may be, for example, gas, water, fuel or a chemical substance.

As an alternative or in addition to the embodiment variant mentioned above, the invention may also provide for the or one of the measured physico-chemical variables to be selected from the group formed by the temperature, the pH value, the conductivity and the pressure of a fluid which flows through the relevant sensor 1 or with which contact is made by the latter.

If at least one parameter is alternatively or additionally measured, this or one of these measured physical or physico-chemical parameters may be characteristic of the quality and/or composition of a fluid which flows through the relevant sensor 1 or comes into contact with the latter, for example turbidity, the presence of pollutants or the presence of a solid and/or gaseous component or solid and/or gaseous components.

It goes without saying that the above-mentioned variables and parameters are only examples which are not restrictive.

Accordingly, data telegrams 17 are continuously formed at a particular time and are gradually transmitted. The sum of the individual data packets $PA_1, \ldots, PA_n$ then forms a continuous time-stamped raw measurement data stream 13.

Figure 4:
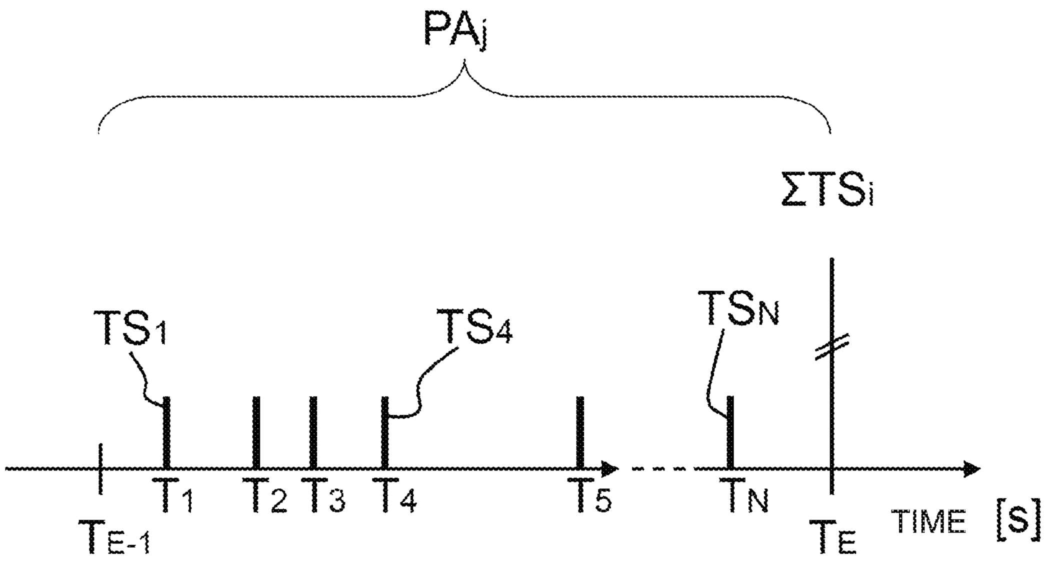
FIG. 4 shows an example of a chronogram of time stamps of the raw measurement data read from a sensor between two uplink transmission operations (messages or telegrams which are emitted at the times TE-1 and TE), in a context of the remote reading of the volume consumption (in this case, the packet $PA_j$ contains N time stamps $TS_N$)

FIG. 4 shows, by way of example, an example of a message structure which is transmitted from the sensor 1 or consumption meter 10 to the data collector 3 or to the head end 4. Each time stamp $TS_1$ to $TS_N$ corresponds in this case, within the scope of the correlation model, to an elementary quantity of fluid which is measured by the sensor 1. The measured fluid may be, for example, gas, water, fuel or a chemical substance. In the interval of time $T_{E-1}$ to $T_E$, N pulses are therefore measured and the time stamps $TS_1$ to $TS_N$ are stored, which, in the case of an amount of one litre for each time stamp TS for example, corresponds to a flow rate of a total of N litres within this interval of time. The measured value preparation means forms a data packet $PA_j$ containing N time stamps $TS_1$ to $TS_N$. Data telegrams $\mathbf{17}_i$, $\mathbf{17}_{i+1}$ are formed from the plurality of data packets, for example $PA_1$ to $PA_6$ and $PA_7$ to $PA_{12}$, according to FIG. 3.

So that the method according to the invention can be adapted to changes in the development of the parameter or the measurement variable and satisfactory updating of the available instantaneous data is ensured at the same time, the method can advantageously involve, in particular, forming a new packet or telegram 17 or carrying out a new data transmission in the form of a message or a telegram as soon as at least one of the two conditions below has been satisfied:

(a) a predefined interval of time has expired, and/or
(b) a predefined quantity of, in particular, compressed collected data or time stamps TS since the previous transmission has been reached.

The use of said condition (b) can involve, for example, regularly checking the size of all new time stamps TS in compressed form after a predefined number of new time stamps TS have been created. If these sizes are close to a critical size, for example close to the size of a packet stipulated by the transmission protocol, a new transmission operation is carried out (condition (b) satisfied before condition (a)) unless the predefined interval of time between two successive transmissions has expired first (condition (a) satisfied before condition (b)).

Figure 5:
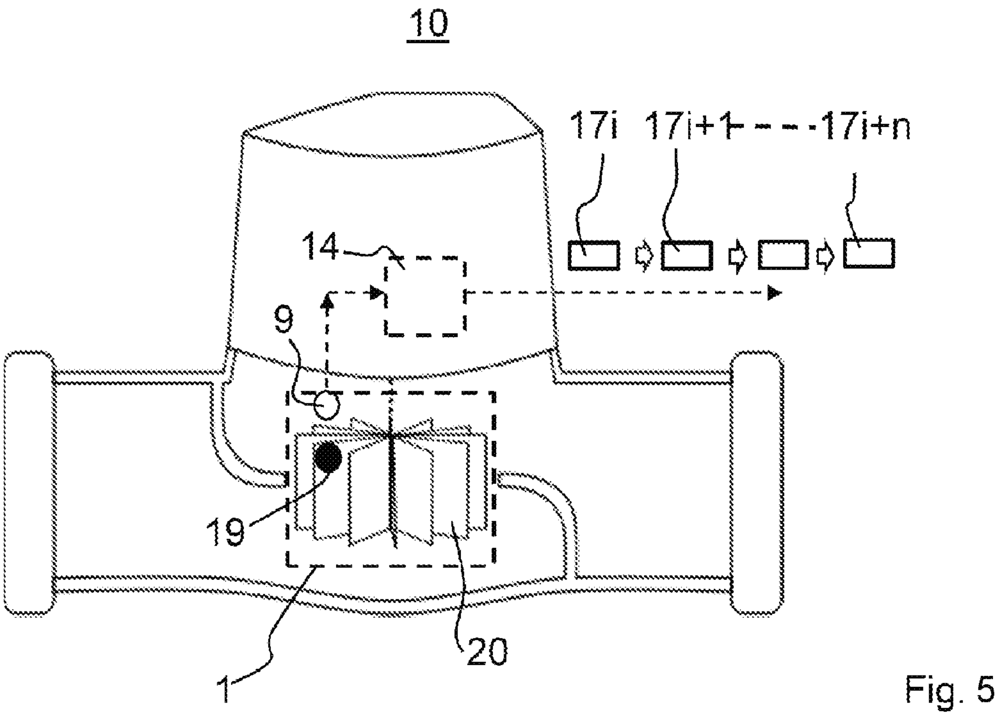
FIG. 5 shows an example of a sensor in a consumption meter in the form of a mechanical flow meter having an impeller, which can be used to generate corresponding raw measurement data for the flow.

FIG. 5 illustrates, only by way of example, a mechanical flow meter 10 having a sensor 1 for the flow. The sensor 1 comprises an impeller 20, a measuring element 9 in the form of a Hall sensor, for example, and a pulse generator element 19 which rotates to a greater or lesser extent depending on the flow through the flow meter 10. The rotational movement of the impeller 20 is captured by the measuring element 9 as a voltage value which is excited by the pulse generator element 19 provided that the relevant vane of the impeller 20 is at the position of the measuring element 9. As a result of the correlation model, it is known, during evaluation, what flow volume one revolution corresponds to. One revolution of the impeller 20 may correspond, for example, to one litre of fluid.

Figure 6:
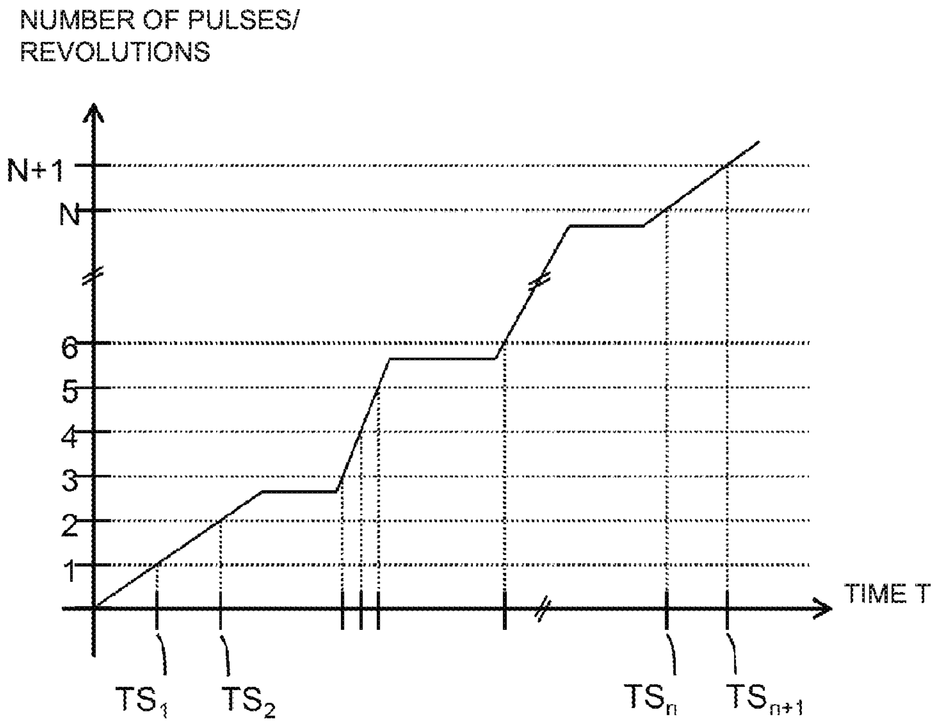
FIG. 6 shows an example of a correlation model for generating time stamps on the basis of the raw measurement data acquired by the sensor according to FIG. 5.

A correlation model is stored in the measured value preparation means 14 and is used to determine in advance the conditions for generating time stamps TS for particular raw measured values. FIG. 6 shows a simplified illustration of an example of such a correlation model, for example for a continuous cumulative flow measurement. In this case, the measuring unit is, for example, a pulse captured by the measuring element 9 of the sensor 1 illustrated in FIG. 5, for example a voltage pulse corresponding to one revolution of the impeller 20. The predefined resolution of the measuring method therefore corresponds in this example to one revolution of the impeller 20. The raw measured values, that is to say the pulses triggered by the revolutions, and the associated times T, are stored in the memory 7 of the sensor 1. The measured value preparation means 14 generates an associated time stamp $TS_1$, $TS_2$ . . . to $TS_{n+1}$ for each raw measured value (that is to say for each revolution/pulse). The time stamps TS are continuously stored in the memory 7. If the impeller 20 does not rotate, a pulse is not generated and a time stamp is therefore not provided either. If the impeller 20 rotates more slowly, the time at which the pulse is captured along the time axis T is accordingly later. Accordingly, a later time stamp TS is generated in this case. As is clear from FIG. 6, a multiplicity of time stamps TS are therefore generated and define the flow continuously measured over the relevant period.

The time stamps TS are combined in data packets $PA_j$ and, according to FIG. 2, are gradually transmitted on request by the data collector 3 to the latter as data telegrams $\mathbf{17}_i$, $\mathbf{17}_{i+1}$, . . . , $\mathbf{17}_{i+n}$ via the primary communication path 5. The data transmission can preferably be carried out here in compressed form. It is consequently a continuous gapless time stamp data stream of very high resolution which is transmitted along the primary communication path 5 in the form of the individual continuous data telegrams $\mathbf{17}_i$, $\mathbf{17}_{i+1}$, . . . , $\mathbf{17}_{i+n}$.

Figure 7:
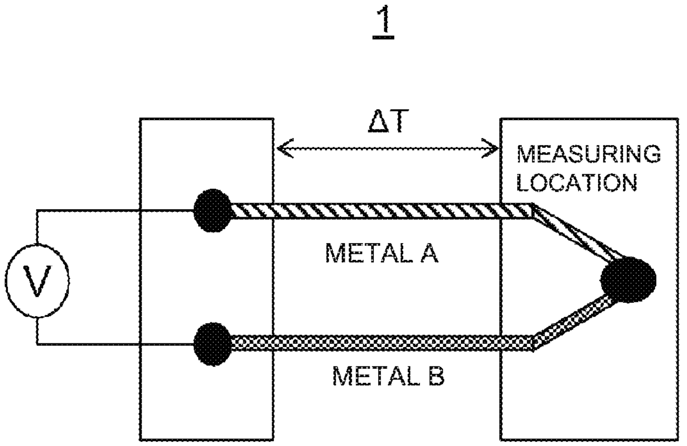
FIG. 7 shows a simplified illustration of an example of a temperature sensor.

The collection of data is not restricted to a flow measurement. FIG. 7 shows, for example, a sensor 1 in the form of a temperature sensor based on a resistance measurement. The temperature sensor comprises two metal conductors (A, B) which are connected to one another in the region of a measuring location and have different thermal conductivity. In the event of a temperature difference $\Delta T$ between the measuring location and the opposite end of the two conductors, a voltage V or a voltage change can be tapped off. In this case, a time stamp TS for a change in the voltage captured by the sensor can be determined as a correlation model.

Figure 8:
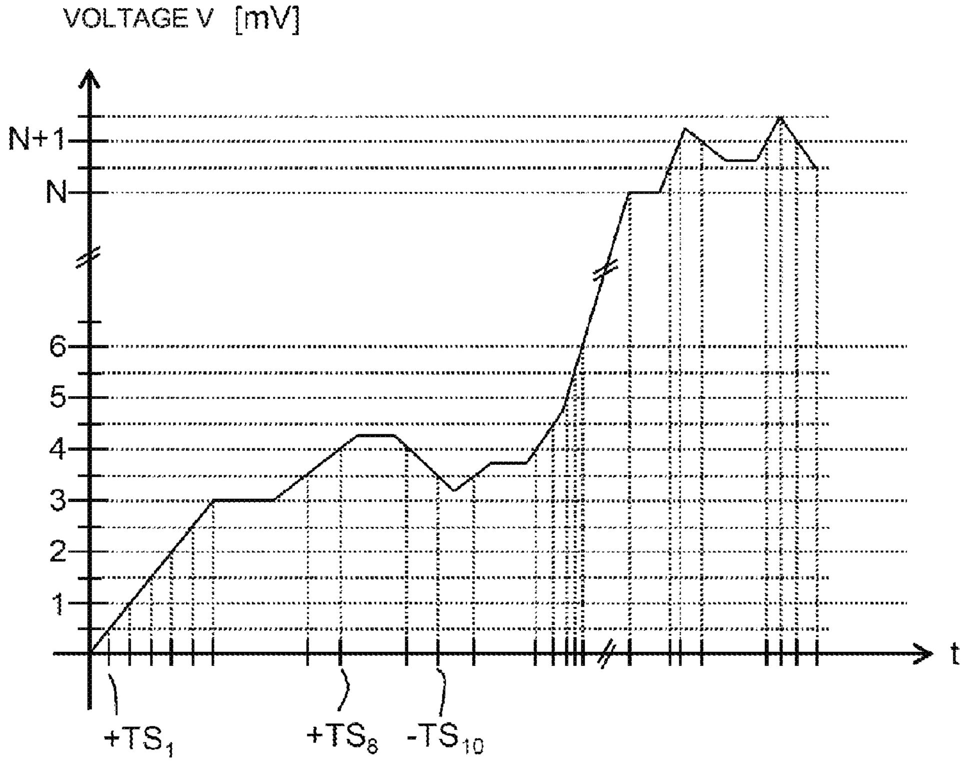
FIG. 8 shows another example of a correlation model for generating time stamps on the basis of the raw measurement data acquired by the sensor according to FIG. 7.

FIG. 8 shows an example of a corresponding raw measurement data curve of voltage values V for generating corresponding time stamps TS in a temperature measurement. Accordingly, an associated time stamp TS is generated for each rise or fall of the voltage, for example by 0.5 mV. The determined resolution of the method is therefore 0.5 mV. Since the curve profile may be rising and falling in the case of a temperature measurement, the time stamps are provided in this case with a sign "+" for rising or "−" for falling. As becomes clear from FIG. 8, a continuous sequence of time stamps TS, which represent the measured voltage profile and therefore the temperature over the period in question in a very accurate and gapless manner, is also obtained here. If the temperature, that is to say the voltage V, does not change, a time stamp is not generated. For the rest, the method corresponds to the measures explained in connection with the initially described example of flow measurement.

Figure 9A:
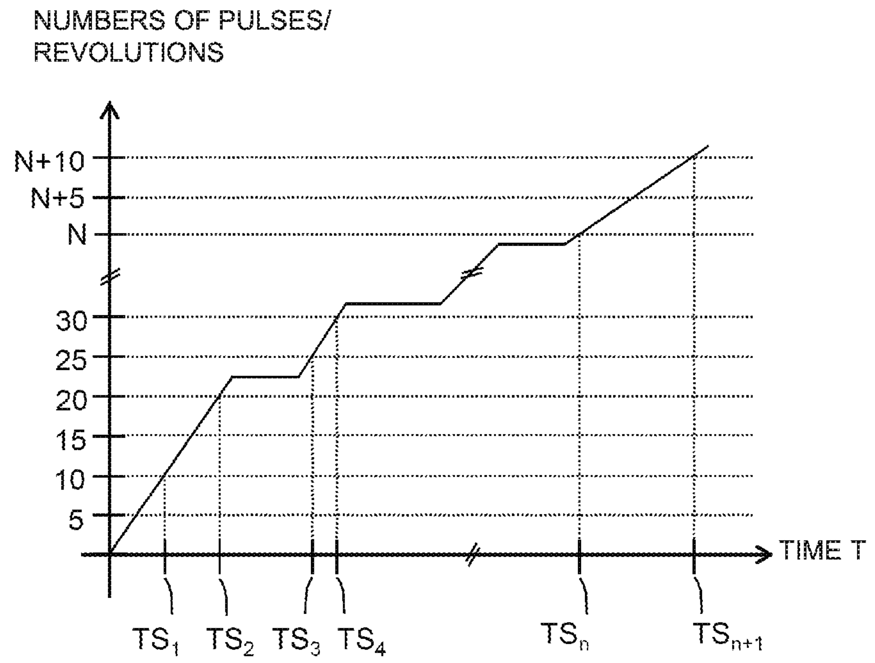
FIGS. 9A-9B show examples of correlation models for generating time stamps on the basis of the raw measurement data read from a sensor with scaling factors.

FIG. 9A shows, by way of example, an example of a further correlation model for the consumption meter from FIG. 5. In this case, each time stamp TS corresponds, for example, to an elementary quantity of fluid which is provided with a scaling factor F and is measured by the sensor 1 depending on its measurement accuracy. The measured fluid may be, for example, gas, water, fuel or a chemical substance. Therefore, the time stamps $TS_1$-$TS_{N+1}$ shown in FIG. 9A correspond in this example to one revolution of the impeller 20 multiplied by the corresponding scaling factor F. Each of the time stamps $TS_1$-$TS_{N+1}$ can therefore each correspond to a flow rate of, for example, one litre multiplied by a scaling factor F specific to each time stamp $TS_1$-$TS_{N+1}$ through a fluid consumption meter 10, and therefore to the measurement resolution of the measuring element in the fluid consumption meter 10 (for example an impeller or an annular piston measuring element).

A scaling factor F of 10 is stipulated until the time $T_2$ for the conditions for generating time stamps TS, with the result that each time stamp $TS_1$ and $TS_2$ corresponds, for example, to a flow rate of 10 litres, provided that the elementary measuring unit or a revolution of the impeller 20 corresponds to 1 litre, for example. At the times $T_3$ and $T_4$, the elementary measuring units are provided with a factor of 5, which corresponds to a flow rate of 5 litres, for example. The scaling factor F can be changed as desired within a data packet $PA_j$, with the result that successive time stamps $TS_1$-$TS_{N+1}$ have different scaling factors F, for example.

A data packet $PA_j$ contains N time stamps $TS_1$-$TS_{N+1}$. The size or the volume of data of the data packets $PA_j$ therefore depends on the used or stipulated scaling factors F of the time stamps TS. A scaling factor F of greater than 1 results in the reconstructed raw measurement data having a lower resolution or granularity. However, the size of the data packets $PA_j$ can be reduced as a result and the volume of data to be transmitted can therefore be reduced.

Figure 9B:
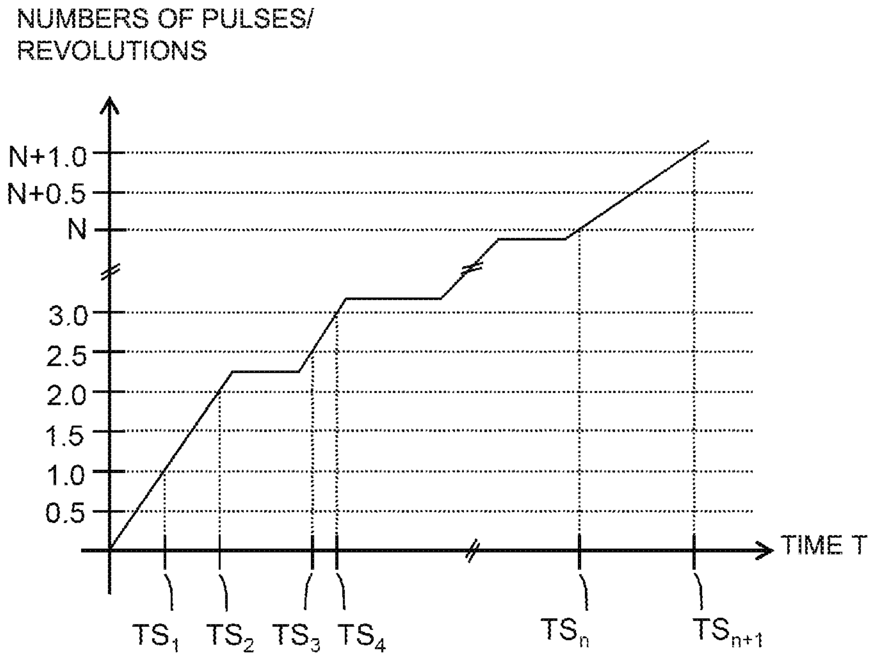

FIG. 9B shows another configuration of a correlation model for the consumption meter from FIG. 5 with a scaling factor F of less than 1. At the times $T_3$ and $T_4$, a time stamp TS has therefore already been generated at half an elementary measuring unit. For this purpose, the impeller 20 may have two or more pulse generator elements 19, for example, with the result that partial revolutions of the impeller 20 can also be captured. On the other hand, a scaling factor of less than 1 results in the reconstructed raw measurement data having a higher resolution or granularity. Conversely, the size of the data packets $PA_j$ can increase as a result, which in turn can increase the volume of data to be transmitted. If, for example, an application requires an increased resolution of the reconstructed raw measurement data, the scaling factor F can be easily adapted.

Figure 10:
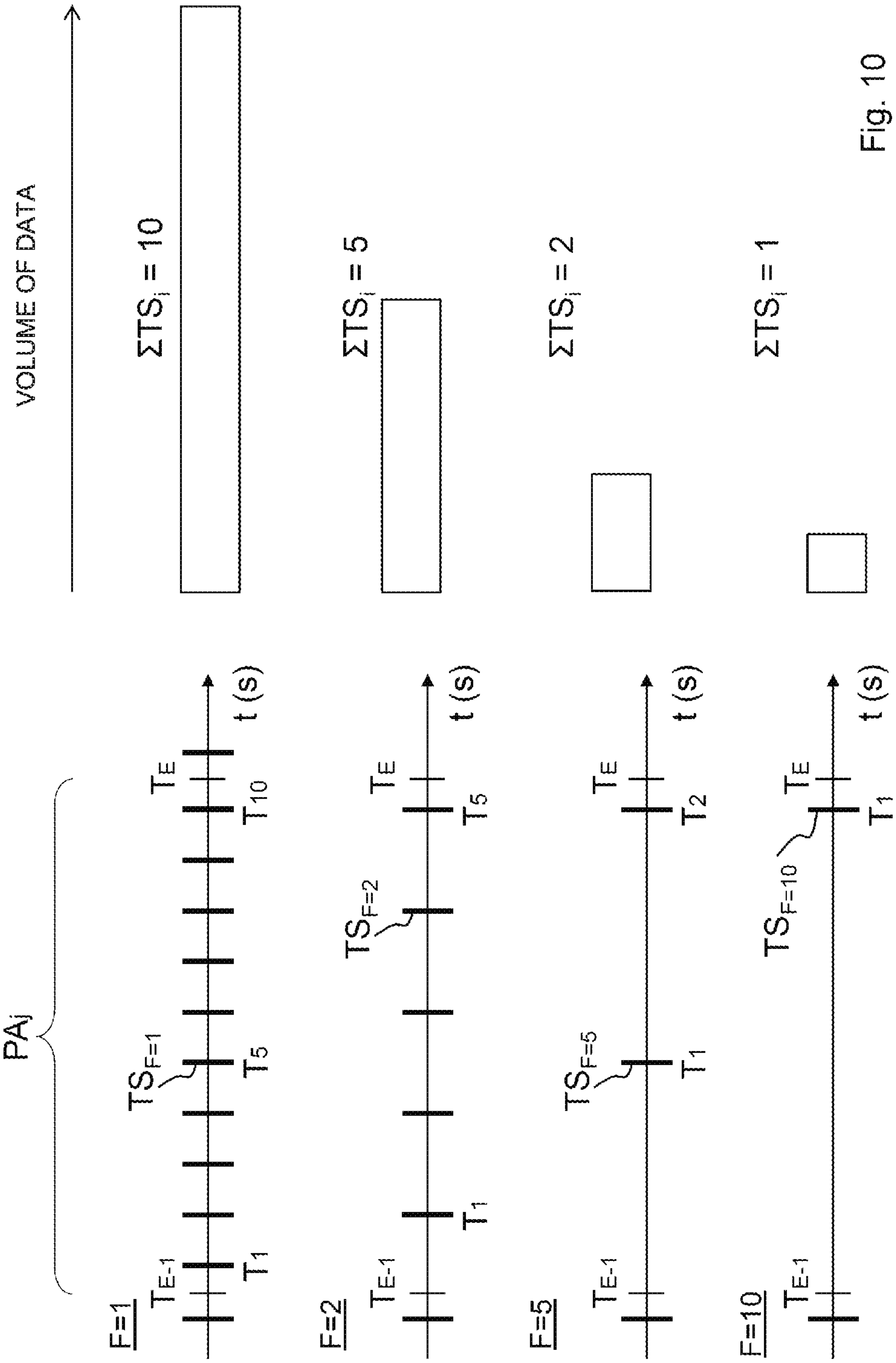
FIG. 10 shows a highly simplified schematic way of illustrating the effect of different scaling factors on the volume of data.

FIG. 10 shows the effect of the scaling factor F on the volume of data. For simpler illustration, the scaling factor F has not been changed within a respective data packet $PA_j$. This should not be understood as a restriction since the scaling factor F can be changed in any desired manner within a data packet $PA_j$, as illustrated in FIGS. 9A and 9B. In addition, for better comparability between the various scaling factors F, the same quantity of the consumable to be measured with a constant flow during the same period $T_{E-1}$ to $T_E$ is assumed. In the case of a quantity of a consumable to be measured of 10 litres, for example, in the same period $T_{E-1}$ to $T_E$, different scaling factors F result in different time stamps TS. For a scaling factor of F=1, an elementary measuring unit of 1 litre thus results, for example. However, the elementary measuring unit can also relate, for example, to the movement of the impeller 20 in a fluid consumption meter 10, as illustrated in FIGS. 5 and 6. The elementary measuring unit is therefore not restricted to physical units, for example litres. 10 elementary measuring units are therefore measured in the period $T_{E-1}$ to $T_E$ and corresponding time stamps $TS_{F=1}$ are generated and stored. This results in a volume of data comprising 10 individual time stamps $TS_{F=1}$. For a scaling factor of F=2, 5 individual time stamps $TS_{F=2}$ result, for F=5, 2 individual time stamps $TS_{F=5}$ result, and for F=10, 1 individual time stamp $TS_{F=10}$ results.

Figure 11:
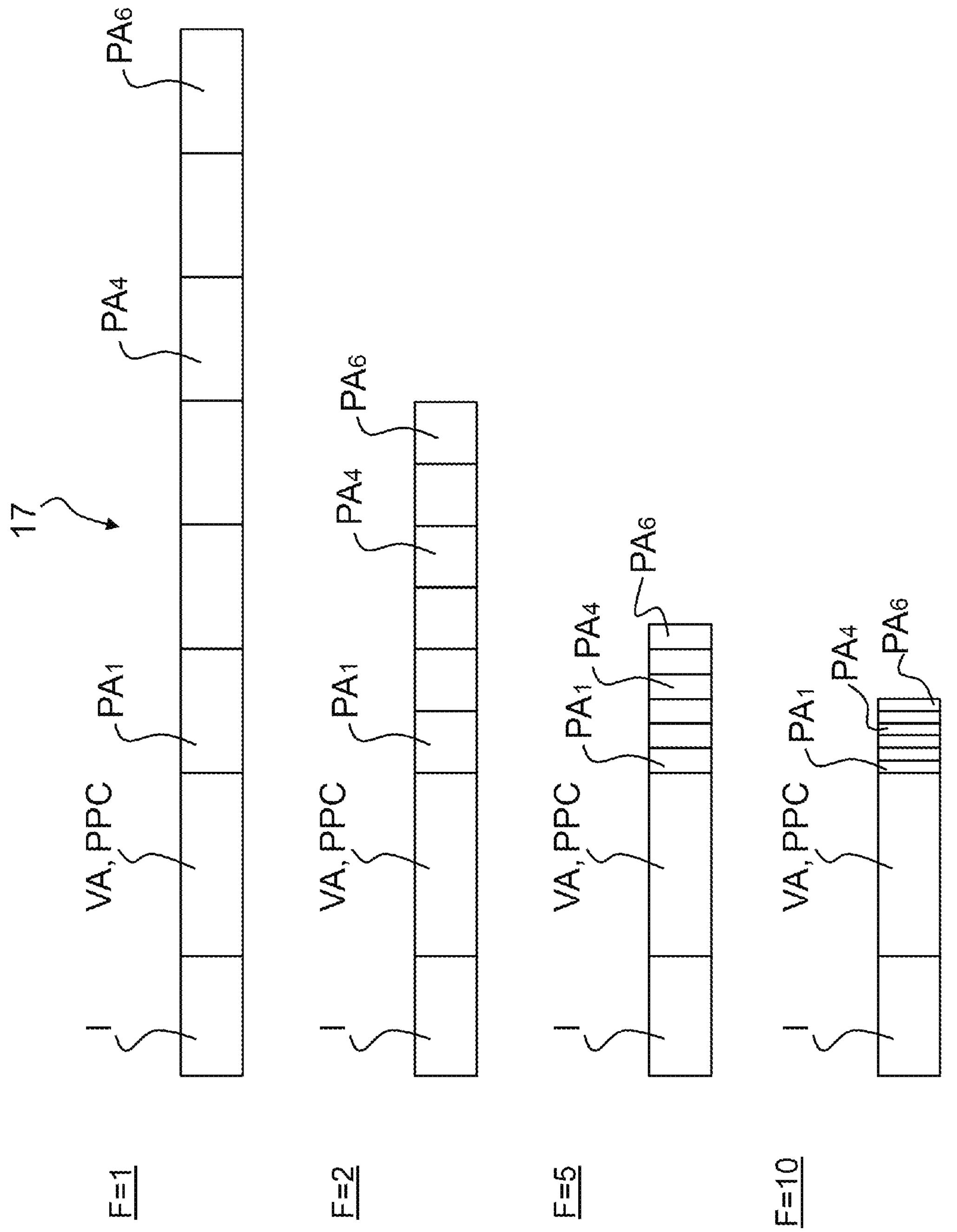
FIG. 11 shows examples of message structures which have different packet sizes $PA_j$ on account of different scaling factors.

FIG. 11 shows examples of message structures. Each data telegram 17 consists of a header which comprises, for example, as illustrated in FIG. 3, the identity I of the respective sensor 1, the absolute cumulative value VA and the value of at least one other physical or physico-chemical parameter PPC of the environment of the relevant sensor 1. The data telegrams 17 also contain a plurality of data packets $PA_1$-$PA_6$ which have different data sizes depending on the respective scaling factor F. The greater the selected scaling factor F, the smaller the data size and therefore the volume of data required for transmission.

Figure 12A:
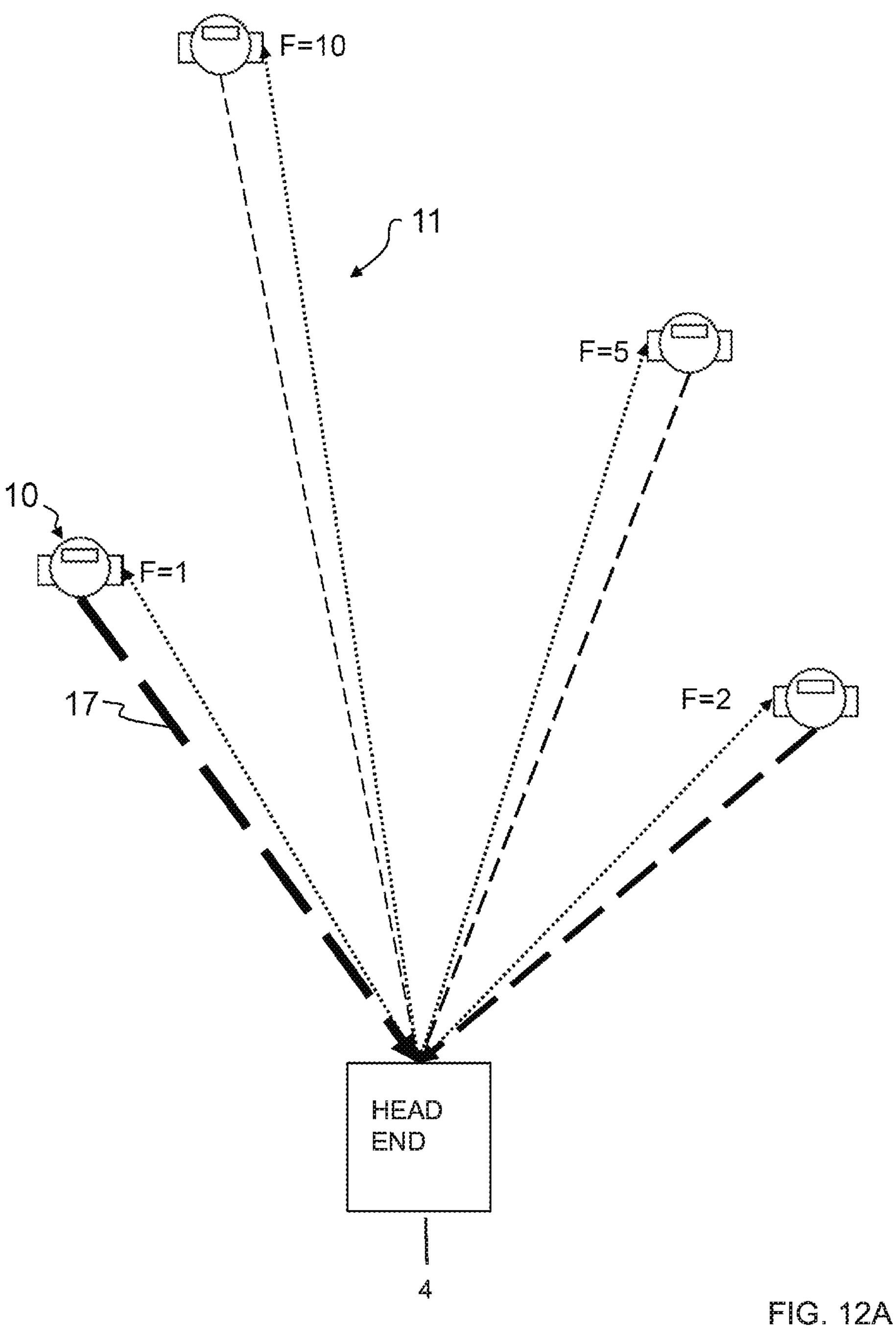
FIGS. 12A-12B show highly simplified schematic ways of illustrating the network structures with a head end, consumption meters and, in one configuration, data collectors.

FIG. 12A shows the head end 4 which individually changes the conditions for generating time stamps TS for each consumption meter 10. For this purpose, the head end 4 transmits a scaling factor F to each consumption meter 10, for example via the radio path 11. The scaling factors F=1, F=10, F=5 and F=2, for example, are therefore transmitted to the consumption meters 10. A scaling factor of F=1 therefore results in the elementary measuring unit which is set or can be measured in the consumption meter 10 being multiplied by a factor of 1 and therefore remaining unchanged. As a result of a higher scaling factor of, for example, F=2, F=5 or F=10, the elementary measuring unit is accordingly increased in the consumption meter 10, which results in the number of time stamps TS being reduced for the same flow. The volume of data when transmitting the time stamps to the head end 4 via the radio path 11 also falls as a result. The size of the data telegrams 17 is indicated by the width of the arrows. The greater the scaling factor F, the smaller the corresponding data stream of data telegrams 17 from the consumption meter 10 for the same quantity of the medium to be measured. The head end 4 can easily react to requirements of applications which require different resolutions by means of the scaling factors F, for example. These applications may be stored and executed in the head end 4.

Figure 12B:
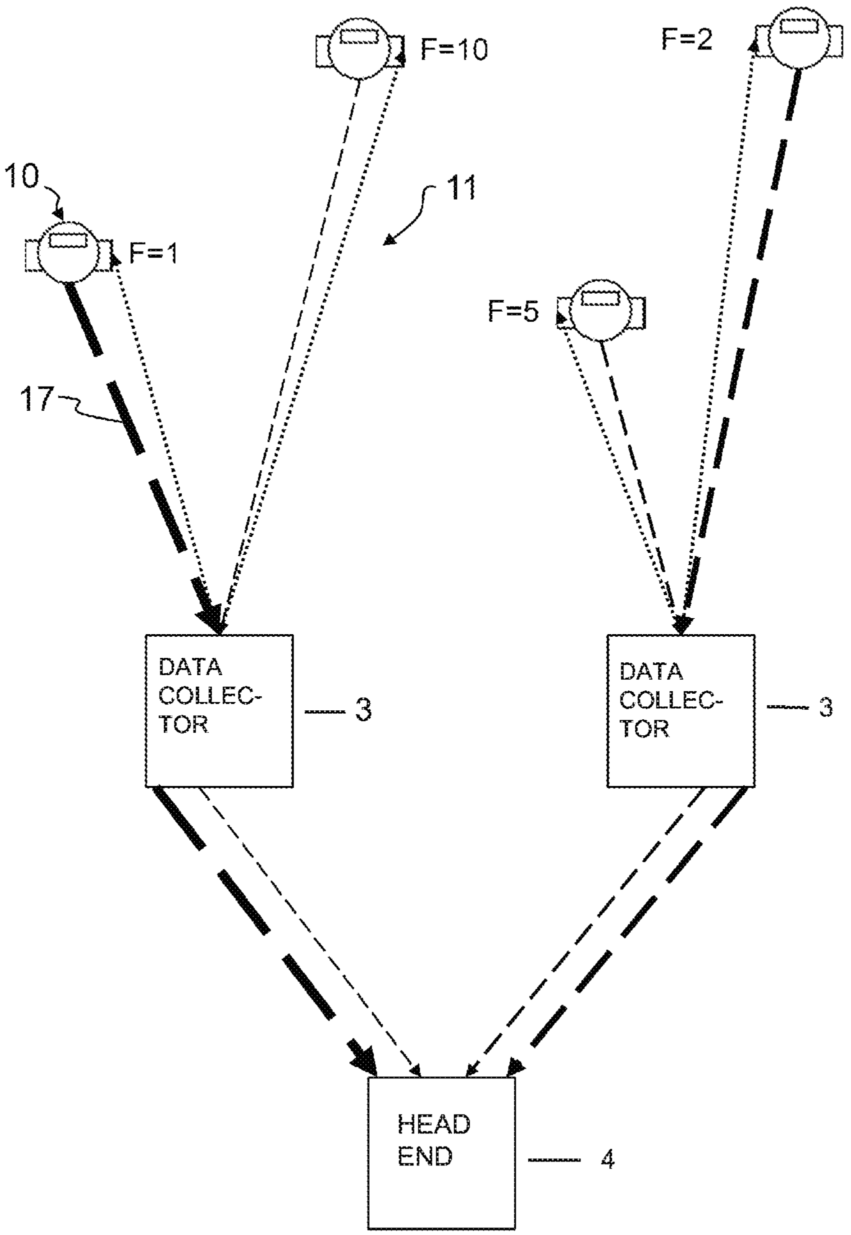

The network structure illustrated in FIG. 12B contains additional data collectors 3 which are interposed between the head end 4 and the individual consumption meters 10. The data collectors 3 transmit the scaling factors F to the individual consumption meters 10. The data collectors 3 can therefore immediately react to interference in the radio connection, for example, and can regulate and possibly reduce the data stream of data telegrams 17 by adapting the scaling factors F.

Figure 13:
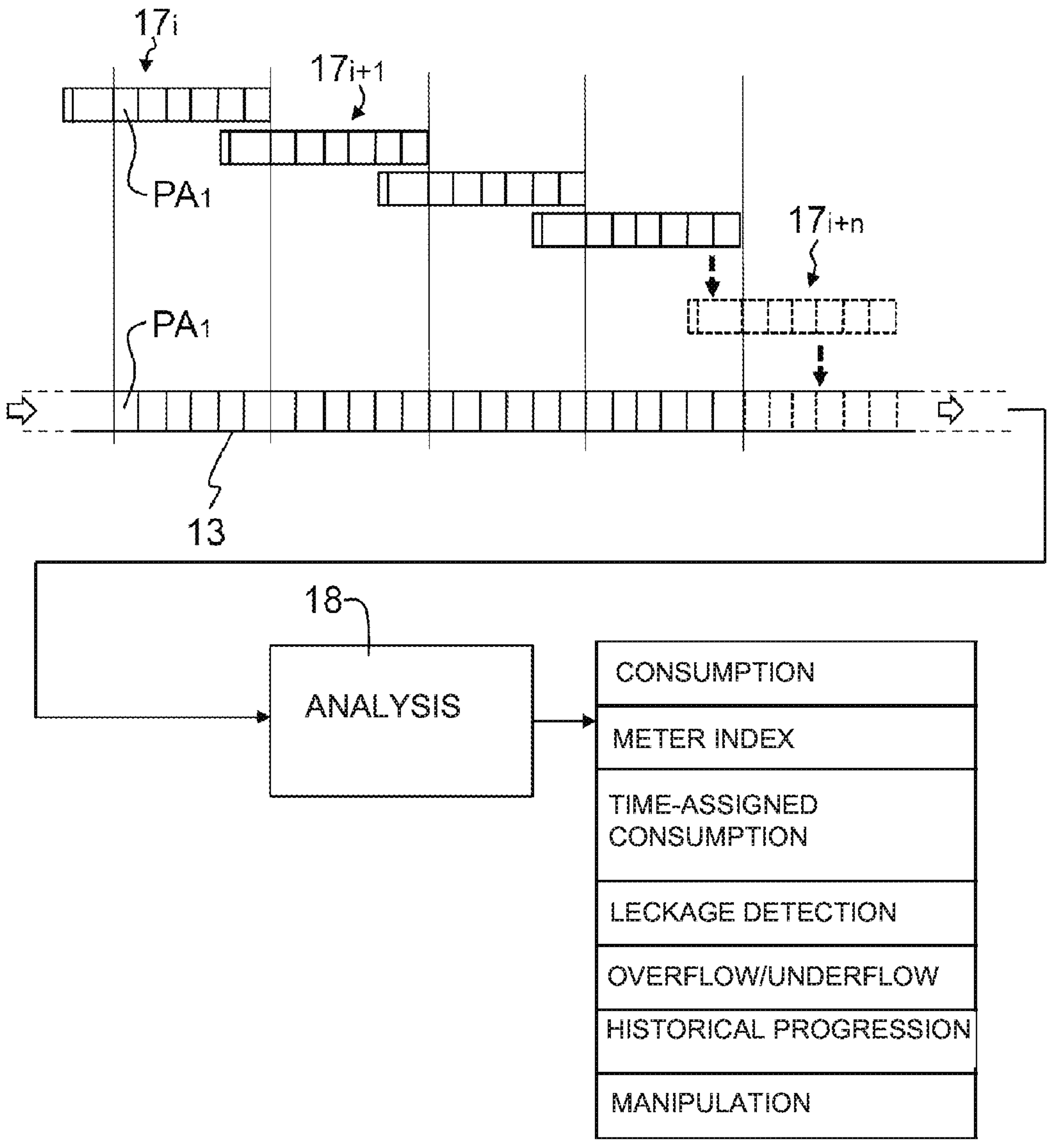
FIG. 13 shows an example of the combination of the data packets or messages or telegrams containing the time stamps and reconstructions to form a time-continuous raw measurement data stream including its evaluation possibilities in a highly simplified schematic manner of illustration.

FIG. 13 shows the further processing of the individual time stamps TS provided in data telegrams $17_i$-$17_{i+n}$ to form a continuous cohesive assignment, from which a gapless raw measurement data stream 13 can be reconstructed on the basis of the correlation model. In this case, the individual data telegrams $17_i$-$17_{i+n}$ are combined in such a manner that the respective data or data packets $PA_j$ or the time stamps TS contained therein are temporally related to those of the adjacent data packets $PA_j$.

As a result of the inventive collection of time stamps TS which are provided by the sensors 1 or consumption meters 10 of the or a particular network, the invention enables all types of evaluation, analysis, checking, monitoring and generally useful or desired processing and utilization since the fundamental individual raw information is available. The evaluation of the provided time stamps TS is preferably carried out in the region of the head end 4 using evaluation means 18 and reveals a multiplicity of items of important information which are needed to manage the supply network but were previously not able to be generated, for example consumption, meter index, time-assigned consumption, leakage detection, over/underflow, historical progression and/or manipulation. Information can therefore also be retrospectively retrieved without a time gap at any time and can be supplied to a previous evaluation.

The raw measurement data reconstructed from the time stamps TS are present in the head end 4, according to the invention, in a very high resolution or granularity without time gaps as a raw measurement data stream 13. Consequently, in contrast to previous methods, very much more usable data than before are available in the head end 4 on account of the method according to the invention.

The raw measurement data stream 13 present in the head end 4 preferably has a resolution in the seconds range, tenths of a second range, hundredths of a second range or thousandths of a second range.

As schematically illustrated in FIG. 1, the invention also relates to a supply network for distributing a consumable, in particular a fluid consumable, using consumption meters 10 which have been accordingly set up and are operated in the supply network. The respective consumption meter 10 comprises, cf. FIG. 2, at least one sensor 1 which can acquire raw measurement data via a measuring element 9. Furthermore, the respective consumption meter 10 comprises a measurement data preparation means 14 which comprises a microprocessor 8, memory 7 and a time reference device 15. In the measurement data preparation means 14, a time stamp TS is effected on the basis of the raw measurement data, the time stamps TS are compressed and preparation is effected into a format which is suitable for transmission via a radio path 11 or via the primary communication path 5 according to a particular protocol.

The consumption meter 10 may comprise its own power supply (not illustrated) in the form of a battery or the like if necessary. The consumption meter 10 can therefore be operated in an autonomous manner in terms of energy.

Evaluation means 18 are provided in the region of the head end 4 and are able to combine the time stamps TS in the individual data telegrams $17_i$-$17_{i+n}$ or their data packets $PA_j$ in a time-continuous manner and without gaps to form a continuous gapless raw measurement data stream 13 and to carry out corresponding decompressions, evaluations, calculations and the like therefrom. The corresponding data preferably comprise all consumption meters 10 in the supply network.

In addition, the above-mentioned system comprises, for the relevant or each geographical area in which the consumption meters 10 are installed, a fixed data collector 3 (concentrator) which, with the consumption meters 10 in the area allocated to it, forms a primary communication path 5 of the supply network. The primary communication path 5 may be in the form of a radio path 11, for example. The data collector 3 is in turn connected to the head end 4 via a tertiary communication path 6. The data can be transmitted in different ways along the tertiary communication path 6, for example via LAN, GPRS, LTE, 3G, 4G etc.

The memory 7 of each sensor 1 or consumption meter 10 preferably form a buffer memory and are suitable and set up to store the content of a plurality of $PA_j$ packets of time stamps TS, in particular in the compressed state, wherein the content or a part of the content of this buffer memory is transmitted during each transmission or retrieval by the data collector 3.

The information collected by each data collector 3 is directly or indirectly transmitted to the head end 4. The "business" functions are also defined and carried out there.

With the method according to the invention, any desired raw measurement data can therefore be sampled and used as triggers for time stamps TS. The time stamps TS may be, in particular, times or time differences. A starting time is preferably defined.

The time stamps TS in the memory 7 of the consumption meter 10 are preferably deleted only when the transmission of the time stamps TS via the primary communication path 5 has been confirmed by the receiver or data collector 3.

It goes without saying that a person skilled in the art understands that the invention can be applied to the measurement and remote reading of a wide variety of parameters and variables: it suffices to be able to accurately date an elementary change (which can be measured by the sensor 1) in a parameter or variable in accordance with the resolution of the sensor 1 in question (the time-stamped elementary variation can correspond to the resolution of the sensor or possibly a multiple of this resolution).

It goes without saying that the invention is not restricted to the embodiments described and illustrated in the accompanying drawings. Changes remain possible, in particular with respect to the provision of the various elements or by means of technical equivalents, without departing from the scope of protection of the invention. The subject matter of the disclosure also expressly includes combinations of partial features or subgroups of features.

The following is a list of reference numerals and symbols used in the description and illustration of the invention:

1 Sensor
2 Radio communication means
3 Data collector
4 Head end
5 Primary communication path
6 Tertiary communication path
7 Memory
8 Microprocessor
9 Measuring element
10 Consumption meter
11 Radio path
13 Raw measurement data stream
14 Measurement data preparation means
15 Time reference device
16 Supply line
17 Data telegram
18 Evaluation means
19 Pulse generator element
20 Impeller
22 Ultrasonic transducer element
23 Ultrasonic transducer element
24 Ultrasonic measurement path
$PA_j$ Data packet
TS Time stamp
F Scaling factor

The invention claimed is:

1. A method for collecting data during operation of a local sensor in a supply network for distributing a consumable, the method comprising:

providing the sensor with a measuring element, with radio communication capability and a memory;

providing elementary measuring units with the measuring element of the sensor, the elementary measuring units corresponding to at least one physical or physico-chemical variable or at least one physical or physico-chemical parameter, and forming raw measurement data;

in order to determine a measurement resolution of the sensor, determining conditions for generating time stamps in advance using a correlation model;

generating time stamps of successive raw measurement data in the sensor based on the correlation model;

transmitting the time stamps via a wired connection and/or a radio connection, whereupon the raw measurement data acquired by the measuring element are reconstructed and evaluated based on the time stamps using the correlation model; and dynamically and temporally changing conditions for generating time stamps within a framework of the correlation model by a data collector and/or a head end, the data collector and/or the head-end system stipulating or dynamically changing the conditions for generating the time stamps and transmitting the conditions to the sensor; and carrying out a new data transmission by transmitting a message or a telegram as soon as the following condition is met: reaching a predefined quantity of the time stamps since a previous transmission.

2. The method according to claim 1, which comprises:

connecting the local sensor to the data collector via a primary communication path;

providing a tertiary communication path between the data collector and a head end; and collecting, storing and/or evaluating the time stamps transmitted by the sensor or a plurality of sensors in the data collector and/or in the head end.

3. The method according to claim 1, which comprises:

determining a particular value, a particular value change or a particular value difference of the at least one physical or physico-chemical variable or the at least one physical or physico-chemical parameter within a scope of the correlation model for the assignment of a time stamp; and when the particular value, the particular value change or the particular value difference is captured by the measuring element, triggering a time stamp and storing the time stamp in the memory of the sensor.

4. The method according to claim 1, which comprises a gradually or incrementally increasing meter reading and/or a value table is/are represented by means of time stamps within the scope of the correlation model.

5. The method according to claim 1, which comprises providing the time stamps with a sign.

6. The method according to claim 1, which comprises transmitting each of a plurality of time stamps as a data packet along the primary communication path.

7. The method according to claim 1, which comprises generating a raw measurement data stream on a basis of the time stamps arriving at the data collector and/or at the head end using the correlation model.

8. The method according to claim 1, which comprises providing a scaling factor for stipulating the conditions for generating time stamps.

9. The method according to claim 8, which comprises transmitting the scaling factor from the data collector and/or from the head end to the sensor.

10. The method according to claim 1, which comprises stipulating conditions for generating time stamps based on requirements of an application which uses the reconstructed raw measurement data.

11. The method according to claim 10, wherein the requirements of the application are temporally variable.

12. The method according to claim 1, which comprises dynamically stipulating conditions for generating time stamps individually for individual sensors of a plurality of sensors.

13. The method according to claim 1, which comprises evaluating the raw measurement data stream, in a further course of the data processing, on a time-historical basis without a time gap irrespective of the measurement resolution of the sensor.

14. The method according to claim 1, wherein the elementary measuring units are an electrical voltage or a current intensity.

15. The method according to claim 1, wherein the measured physical variable relates to a supply medium selected from the group consisting of water, electricity, fuel, and gas, of a supply network.

16. The method according to claim 1, wherein the measured physical or chemico-physical parameters is characteristic of a quantity, a quality and/or a composition of a fluid which flows through the sensor or with which contact is made by the sensor.

17. The method according to claim 1, which comprises generating a time stamp with the elementary measuring unit as soon as the elementary measuring unit receives a pulse.

18. The method according to claim 1, wherein the raw measurement data stream has a temporal resolution which is determined or conditioned by the sensor sampling rate or measuring element sampling rate or a multiple thereof.

19. The method according to claim 1, wherein the raw measurement data stream is continuous and/or complete taking a continuous temporal resolution as a basis.

20. The method according to claim 1, which comprises packaging the time stamps by formatting them in data packets of a predetermined fixed size, wherein, each time the accumulated data reach the size of a data packet or the predefined interval of time has expired, a new transmission is initiated.

21. The method according to claim 1, which comprises carrying out the data transmission with redundancy.

22. The method according to claim 21, wherein the redundancy in the transmission comprises repeatedly transmitting the same time stamps and/or repeatedly transmitting the same data packet in a plurality of successive transmission operations.

23. The method according to claim 1, which comprises transmitting the time stamps in compressed form.

24. The method according to claim 23, which comprises compressing the time stamps with loss-free compression.

25. The method according to claim 23, which comprises compressing the time stamps in a compression with a predefined permissible loss level.

26. The method according to claim 1, which comprises collecting data in connection with a consumption, a physical or physico-chemical parameter and/or an operating state, during operation of a plurality of local sensors for consumption meters as part of a supply network which includes a plurality of local sensors.

27. A method for collecting data during operation of a local sensor in a supply network for distributing a consumable, the method comprising:

providing the sensor with a measuring element, with radio communication capability and a memory;

providing elementary measuring units with the measuring element of the sensor, the elementary measuring units corresponding to at least one physical or physico-chemical variable or at least one physical or physico-chemical parameter, and forming raw measurement data;

in order to determine a measurement resolution of the sensor, determining conditions for generating time stamps in advance using a correlation model;

generating time stamps of successive raw measurement data in the sensor based on the correlation model;

transmitting the time stamps via a wired connection and/or a radio connection, whereupon the raw measurement data acquired by the measuring element are reconstructed and evaluated based on the time stamps using the correlation model;

dynamically changing conditions for generating time stamps within a framework of the correlation model; and stipulating the conditions for generating time stamps based on a power analysis of the radio connection.

28. A sensor, configured for operation in accordance with the method according to claim 1.

29. A supply network for distributing a consumption medium, the supply network comprising:

at least one local sensor for generating and/or forwarding time stamps of raw measurement data on a basis of a correlation model, said local sensor being configured for operation within a method according to claim 1;

a data collector;

a primary communication path between said sensor and said data collector;

a head end for evaluating the measurement data; and a tertiary communication path between said data collector and said head end.

30. The supply network according to claim 29, wherein:

said at least one local sensor is one of a plurality of local sensors; and the raw measurement data relate to a consumption of the consumption medium, a physical or physico-chemical parameter, and/or an operating state of a consumption meter.

* * * * *